(No Model.)
A. W. LANE.
WHEEL HUB.
No. 350,254. Patented Oct. 5, 1886.
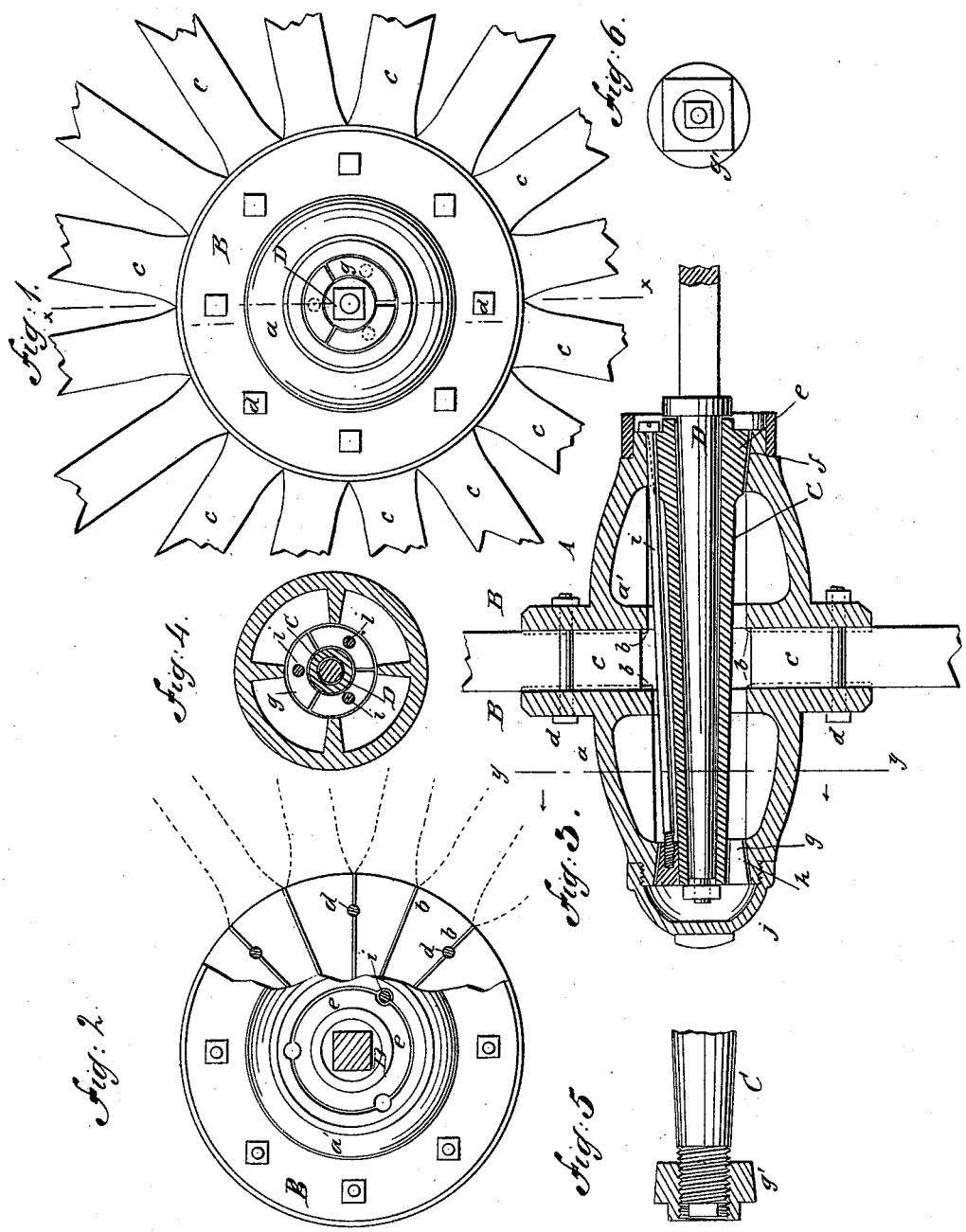
WITNESSES:
INVENTOR:
A. W. Lane
BY Munn & Co
ATTORNEYS.

UNITED STATES PATENT OFFICE.

ANDREW WILSON LANE, OF JANESVILLE, CALIFORNIA.

WHEEL-HUB.

SPECIFICATION forming part of Letters Patent No. 350,254, dated October 5, 1886.

Application filed March 12, 1886. Serial No. 195,047. (No model.)

*To all whom it may concern:*

Be it known that I, ANDREW WILSON LANE, of Janesville, in the county of Lassen and State of California, have invented a new and useful Improvement in Hub and Box Fastenings, of which the following is a specification, reference being had to the annexed drawings, forming a part thereof, in which—

Figure 1 is a front end elevation of a wagon-hub constructed according to my improvement. Fig. 2 is a rear elevation with parts broken away to show the internal construction. Fig. 3 is a longitudinal section taken on line $x\ x$ in Fig. 1. Fig. 4 is a transverse section taken on line $y\ y$ in Fig. 3. Figs. 5 and 6 are detail views of a modified form of box end.

Similar letters of reference indicate corresponding parts in the different figures of the drawings.

The object of my invention is to provide a reliable and inexpensive means of securing the boxes in the hubs of wagon-wheels of all kinds, but more especially in metallic hubs.

My invention consists in the construction and arrangement of parts, as will be hereinafter fully described and claimed.

The wagon-hub A in the present case is formed of iron in two halves, $a\ a'$, provided with flanges B, having radial ribs $b$, for receiving between them the inner ends of the spokes $c$. Transverse bolts $d$ pass through the flanges B and through alternate radial ribs $b$, and clamp the flanges B upon the sides of the spokes $c$. Each half of the hub A is cored to receive the box C, which is received on the axle D in the usual way. The larger end of the box C is provided with a conical collar, $e$, which is fitted to a conical seat, $f$, in the half $a'$ of the iron hub, and to the opposite and smaller end of the box C is fitted a conical collar, $g$, which in the present case is made of three sections, as shown in Fig. 4. The conical collar $g$ is fitted to a seat, $h$, in the smaller end of the half $a$ of the hub. The sections of the conical collar $g$ are held in place in the wagon-hub on the box C by bolts $i$, passing through apertures formed partly in the larger end of the hub and partly in the collar $e$, and passing longitudinally through the hub into threaded holes formed in the sections of the collar. The bolts $i$ also lock the box and hub together when in said grooves. The bolts $i$ draw the collar-sections into the conical end of the hub and over the conical end of the box C, and thus wedge the box firmly in its place in the hub.

Instead of employing the sectional conical collar $g$, I may thread the smaller end of the box C, and apply thereto a conical internally-threaded collar, $g'$, as shown in Fig. 5, which, when screwed down upon the seat $h$ upon the end of the hub, will draw the collar $e$ of the box firmly down to its seat, and will also seat itself in the smaller end of the hub.

Whenever the spokes $c$ become loose, they may be tightened by either driving them in in the usual way, or by drawing the flanges B down upon the sides of the spokes by means of the bolts $d$, or both, and should the box C become loose in the hub it may be tightened in the manner already described. The smaller end of the hub is threaded externally to receive a cap, $j$, which covers the end of the hub, axle, and box.

My improved hub and box fastening is adapted for use in all climates, as it is in no way affected by changes of temperature or by moisture or by dryness.

Having thus described my invention, what I claim as new, and desire to secure by Letters Patent, is—

1. The hub A, having conical sockets $f\ h$ at its opposite ends, the box C, formed with the collar $e$ resting in the socket $f$, the conical collar $g$, formed of a series of longitudinally-divided sections, and the bolts $i$—one for each section of the collar—extending longitudinally through the hub into the said sections, substantially as set forth.

2. The hub A, having conical sockets $f\ h$ at its opposite ends, the box C, formed with the collar $e$ resting in the socket $f$, the outer face of the collar having grooves registering with grooves in the wall of the said socket $f$, the collar at the opposite end of the box in the socket $h$, and bolts extending through the grooves in the collar $e$ and socket into the opposite collar, substantially as set forth.

3. The hub A, formed in two sections, each having a flange, B, connected by bolts $d$, conical sockets $f\ h$, the box C, having a collar, $e$, in the socket $f$, longitudinal apertures between the socket and collar, the sectional collar $g$ in the socket $h$, and the bolts $i$, passed through the said apertures and hub into the sections of the collar $g$, whereby the bolts $i$ will assist in holding the hub-sections and collars together and also prevent the box from turning in the socket $f$, substantially as set forth.

ANDREW WILSON LANE.

Witnesses:
A. McCONAMON,
T. A. VAN NORDEN.